United States Patent
Clark et al.

[11] Patent Number: 5,913,520
[45] Date of Patent: Jun. 22, 1999

[54] CENTERING DEVICES FOR A SPLIT MECHANICAL SEAL

[75] Inventors: Marlen S. Clark, Newburyport, Mass.; Henri V. Azibert, Windham, N.H.

[73] Assignee: A.W. Chesterton Company, Stoneham, Mass.

[21] Appl. No.: 08/914,663

[22] Filed: Aug. 19, 1997

Related U.S. Application Data

[60] Continuation of application No. 08/442,319, May 16, 1995, Pat. No. 5,725,220, which is a division of application No. 08/168,874, Dec. 16, 1993, Pat. No. 5,711,532.

[51] Int. Cl.[6] .................................................. F16J 15/34
[52] U.S. Cl. ............................................................. 277/370
[58] Field of Search .................................. 277/358, 370, 277/371, 374, 375

[56] References Cited

U.S. PATENT DOCUMENTS

| | | |
|---|---|---|
| 2,844,393 | 7/1958 | Jensen . |
| 3,050,319 | 8/1962 | Colby . |
| 3,161,414 | 12/1964 | Porges . |
| 3,486,760 | 12/1969 | Tracy . |
| 4,576,384 | 3/1986 | Azibert . |
| 4,989,882 | 2/1991 | Warner et al. . |
| 5,067,733 | 11/1991 | Nagai et al. . |
| 5,294,132 | 3/1994 | Duffee et al. . |
| 5,490,682 | 2/1996 | Radosav et al. . |
| 5,577,738 | 11/1996 | Fukuda . |

*Primary Examiner*—Anthony Knight
*Assistant Examiner*—John L. Beres
*Attorney, Agent, or Firm*—Lahive & Cockfield, LLP; Anthony A. Laurentano

[57] ABSTRACT

A centering mechanism for a split mechanical seal that circumferentially and uniformly separates a gland assembly having a pair of gland segments from a holder assembly having a pair of holder segments, thereby centering the seal relative to a rotary shaft of a stuffing box. The gland segments and the holder segments are concentrically disposed about the shaft.

7 Claims, 7 Drawing Sheets

CENTERING DEVICES FOR A SPLIT MECHANICAL SEAL

REFERENCE TO RELATED APPLICATION

This patent application is a continuation application of U.S. Ser. No. 08/442,319, filed May 16, 1995, entitled SECURING AND CENTERING DEVICES FOR A SPLIT MECHANICAL SEAL, now U.S. Pat. No. 5,725,220, which is a divisional patent application of U.S. Ser. No. 168,874, filed Dec. 16, 1993, entitled SECURING AND CENTERING DEVICES FOR A SPLIT MECHANICAL SEAL, now U.S. Pat. No. 5,711,532.

BACKGROUND

This invention relates generally to mechanical seals. More particularly, the present invention relates to universal split mechanical seals that provide strong sealing capabilities under different operating conditions.

Split mechanical seals with resiliently mounted faces are employed in a wide variety of mechanical apparatuses to provide a pressure-tight and fluid-tight seal. The mechanical seal is usually positioned about a rotating shaft that is mounted in and protruding from a stationary housing. The seal is usually bolted to the housing at the shaft exit, thus preventing the loss of pressurized process fluid from the housing.

Conventional split mechanical seals include face type mechanical seals, which include a pair of sealing rings that are concentrically disposed about the shaft, and axially spaced from each other. The sealing rings each have sealing faces that are biased into sealing contact with each other. Usually, one seal ring remains stationary, while the other ring contacts the shaft and rotates therewith. The mechanical seal prevents leakage of the pressurized process fluid to the external environment by biasing the seal ring sealing faces in sealing contact with each other. The rotary seal ring is usually mounted in a holder assembly which is disposed in a chamber formed by a gland assembly. The holder assembly has a pair of holder halves, each having a pair of sealing faces, that are secured together by a number of screws. Likewise, the gland assembly has a pair of gland halves, each having a pair of sealing faces, that are also secured together by a number of screws. The sealing rings are often divided into segments, each segment having a pair of sealing faces, thereby resulting in each ring being a split ring that can be mounted about the shaft without the necessity of freeing one end of the shaft ends.

Each holder and gland halve has formed on one of the sealing faces a gasket groove for mounting a sealing gasket. When the gasket is mounted within the groove and the halves are secured together by the screws, the gasket is placed in intimate facing contact with the opposite sealing face of the holder or gland half. This facing contact forms a pressure-tight and a fluid-tight seal between the respective gland and holder halves.

The gland assembly is usually centered on the stationary housing prior to securing thereto by centering the shaft and holder assembly disposed within the chamber formed by the gland assembly, thereby determining the proper mounting position of the gland assembly. Conventional methods for centering the gland assembly include using a number of plastic elongated tabs mounted on the exterior seal housing at an outboard end of the seal. The plastic tabs protrude evenly into the gland chamber, centering the shaft and holder assembly.

Another drawback of conventional split seals is that the screws which secure the gland and holder segments together are usually mounted in predetermined tapholes, which typically necessitate rotating the shaft after securing one screw, to affix the other screws. Additionally, during disassembly of the mechanical seal, the screws can become disengaged from either segment of the gland and holder, thereby increasing the likelihood that the screws can become detached and damage other components of the housing, or lost.

Still another drawback of the conventional seals is that the conventional centering mechanisms center off the shaft at the outboard end of the seal. In applications where there is a minimal distance between the seal outboard end and an axial obstruction it is difficult to insert the centering mechanism. Consequently, it is difficult to center the gland assembly relative to the shaft. Additionally, the plastic tabs can become disengaged from the seal, increasing the likelihood that the tabs can become lost. Further conventional seals employing integrally formed centering mechanisms add distance to the overall length of the seal, which can preclude the use of the seal.

As the above described and other prior art sealing systems have proven less than optimal, an object of this invention is to provide an improved mechanical seal that provides a fluid-tight seal under a variety of operating pressure conditions.

Another object of the invention is to provide a single split mechanical seal that can function under different operating pressures, thereby eliminating the need for employing different seals.

Still another object of the invention is to provide a split mechanical seal that is relatively easy to assemble and to disassemble.

Yet another object of the invention is to provide a seal centering mechanism that is relatively easy to manipulate, while being able to function in different seal assemblies.

Other general and more specific objects of this invention will in part be obvious and will in part be evident from the drawings and the description which follow.

SUMMARY OF THE INVENTION

These and other objects are attained by the invention which provides, in one aspect, a split mechanical seal for mounting to a stationary housing that contains a rotating shaft. The mechanical seal includes first and second seal ring assemblies, at least one resilient biasing element and at least one axial biasing element. The first and second seal ring assemblies each include a seal ring having two segments that are resiliently supported in the seal. The segments have an outer surface and a pair of segment sealing faces disposed at opposite ends of the segments. The first seal ring is a stationary seal ring and the second seal ring is a rotary seal ring.

In one aspect of the invention, the resilient biasing element is concentrically disposed about and in intimate contact with the outer surface of one of the seal rings, for applying a first radially inward force that biases the sealing faces of the seal ring segments into sealing contact with each other. In a preferred embodiment, the mechanical seal includes a pair of resilient biasing elements disposed about each seal ring, and the resilient biasing element is preferably an elastomeric member.

In another aspect of the invention, the axial biasing element is associated with at least one seal ring for generating and applying, in cooperation with the elastomeric member, a second radially inward force. The second force also operates to bias the segment sealing faces together when the mechanical seal is exposed to a selected pressure condition. In a preferred embodiment, the axial biasing element is an abutment, integrally formed with the segments of both seal rings, that has a radially outwardly slanted outer surface.

According to another aspect of the invention, when the mechanical seal is exposed to the selected pressure condition, e.g., ambient pressure greater than the internal pressure of the mechanical seal, the elastomeric member is disposed in intimate contact with the abutment, and applies an axial force thereto. The abutment transforms the axial force into an axial component and a second radially inward component. This second radially inward component also operates to bias the sealing faces of the seal ring segments into sealing contact with each other.

According to a preferred practice of the invention, the split seal ring of this invention includes one ring mounted in a holder assembly to rotate with the rotating shaft, and a second ring mounted in a gland assembly fixed to the stationary housing surrounding the shaft. Each of the seal rings has a sealing face brought into sealing contact with the other to form a seal while the faces are rotating with respect to one another. In order to provide for convenient assembly and disassembly of the seal about the shaft, the seal rings, as well as the housing assembly and the gland assembly, are formed in segments. It is a significant feature of the present invention that each of the seal ring segments be allowed to move axially with respect to one another, while maintaining the individual rings biased toward one another into sealing contact. This is accomplished by resiliently mounting each ring in its respective holder and gland while providing axial bias toward the interface therebetween.

In this configuration it is also essential that the seal ring segments be resiliently biased in the radial direction to maintain the sealing contact at the segment interfaces where the segments join to form the individual rings. In a typical embodiment, this is accomplished by placing a circular elastomer O-ring around the periphery of each seal ring. Since the purpose of the overall seal assembly is to maintain a seal between ambient atmosphere and the internal fluids surrounding the rotating shaft, these segment seals must be capable of maintaining their sealed condition for a variety of pressure conditions between the ambient atmosphere and the internal fluids. These may include a higher pressure in the ambient as compared to the internal fluid or vice versa. The elastomer O-rings also provide for resilient mounting of the rings with respect to axial movement, and some axial biasing of the rings toward one another. The fluid spaces within the mechanical seal are such that when the internal fluid pressure is negative with respect to the ambient it creates a radial biasing force which tends to open the intersegment seals, thereby leaking ambient fluid into the process fluid. This occurs despite the fact that fluid pressure exerts an axial force against the O rings moving them toward increased contact at the interface between the rotating seal ring and the stationary seal ring.

In the present inventive mechanical seal, this problem is addressed by providing a seat for the O-ring about the seal ring segments that has a sloping outer surface such that axial pressure by the O-ring against that surface is converted into both axial and radial components so that the radial component, directed toward the center of the ring, maintains the above intersegment seals.

According to a further aspect of the invention, the gland segments and the holder segments include seal faces having formed thereon a gland gasket groove and a holder gasket groove, respectively. The gland groove mounts a gland gasket, and when disposed therein, has an exposed portion that extends beyond the gland seal face. The exposed gasket portion is captured in, rather than sealingly abuts, the gland groove formed on the seal face of the other gland segment. Likewise, the holder groove mounts a holder gasket that has an exposed portion extending from the holder seal face that is captured in the holder groove formed on the sealing face of the other holder segment.

According to another aspect of the invention, the gland and holder assembly are apertured with one or more fastener-receiving apertures. The aperture has a tapped portion axially spaced from the segment sealing face and a clearance portion, opening onto the sealing face, that has a diameter larger than the tapped portion. The aperture mounts a fastener, such as a screw, that has a shaft and a screw-head. The shaft includes a threaded distal portion and a proximal portion, where the diameter of the distal portion is greater than the diameter of the proximal portion. This configuration positively maintains the screw within the aperture, preventing loss of the screw.

According to other aspects of the invention, the gland and holder assemblies have integrally formed therein a pair of screw housings. The housings have an aperture formed therethrough that is adapted to receive a centering strap. The centering strap circumferentially and uniformly separates the gland assembly from the holder assembly disposed about the shaft.

In another preferred practice of the invention, the holder segments have an outer surface that have mounted thereon a number of wearable protrusions. The protrusions uniformly separate the holder segment outer surfaces from an inner surface of the gland assembly.

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

FIGS. 1–4 depict a split mechanical seal 10 according to a preferred embodiment of the invention. The mechanical seal 10 is preferably concentrically disposed about a shaft 12 that extends along a first axis 13 and is secured to an external wall of a housing 14, such as a pump or the like. The shaft is mounted, at least partly, within the housing. The mechanical seal 10 constructed in accordance with the teachings of this invention provides a fluid-tight seal, thereby preventing a process medium, e.g., hydraulic fluid, from escaping the housing 14. The fluid-tight seal is achieved by a pair of split seal rings 20 and 30, a first or rotating seal ring 20 and a second or stationary seal ring 30, each having a smooth arcuate sealing surface 21, 31 and a pair of segment sealing faces 22, 32. The smooth arcuate sealing surface of each seal ring is biased into sealing contact with the corresponding surface of the other seal ring segment. Similarly, the segment sealing faces 22,32 of the ring segments 25 and 33 are biased into sealed relationship with each other. Thus, these individual seal faces provide a fluid-tight seal operable under a wide range of operating conditions, including a vacuum condition, as described in greater detail below.

The illustrated mechanical seal 10 includes, in addition to the rotary seal ring 20 and the stationary seal ring 30, a seal gland assembly 40 and a seal ring holder assembly 110. The seal gland assembly 40 has a pair of gland segments 41, 42, each segment identical to the other. The gland segment 41 has an inner surface that has a first face 46, and an integrally formed and stepped second face 50 that extends radially outward from the first face 46. The first face 46 and the second face 50 form, in combination, a first connecting annular wall 48. A stepped third face 54 extends radially outward from the second face 50 and forms, in combination therewith, a second annular connecting wall 52. A sloped fourth face 56 extends radially inward from the gland segment third face 54.

Figure 2:
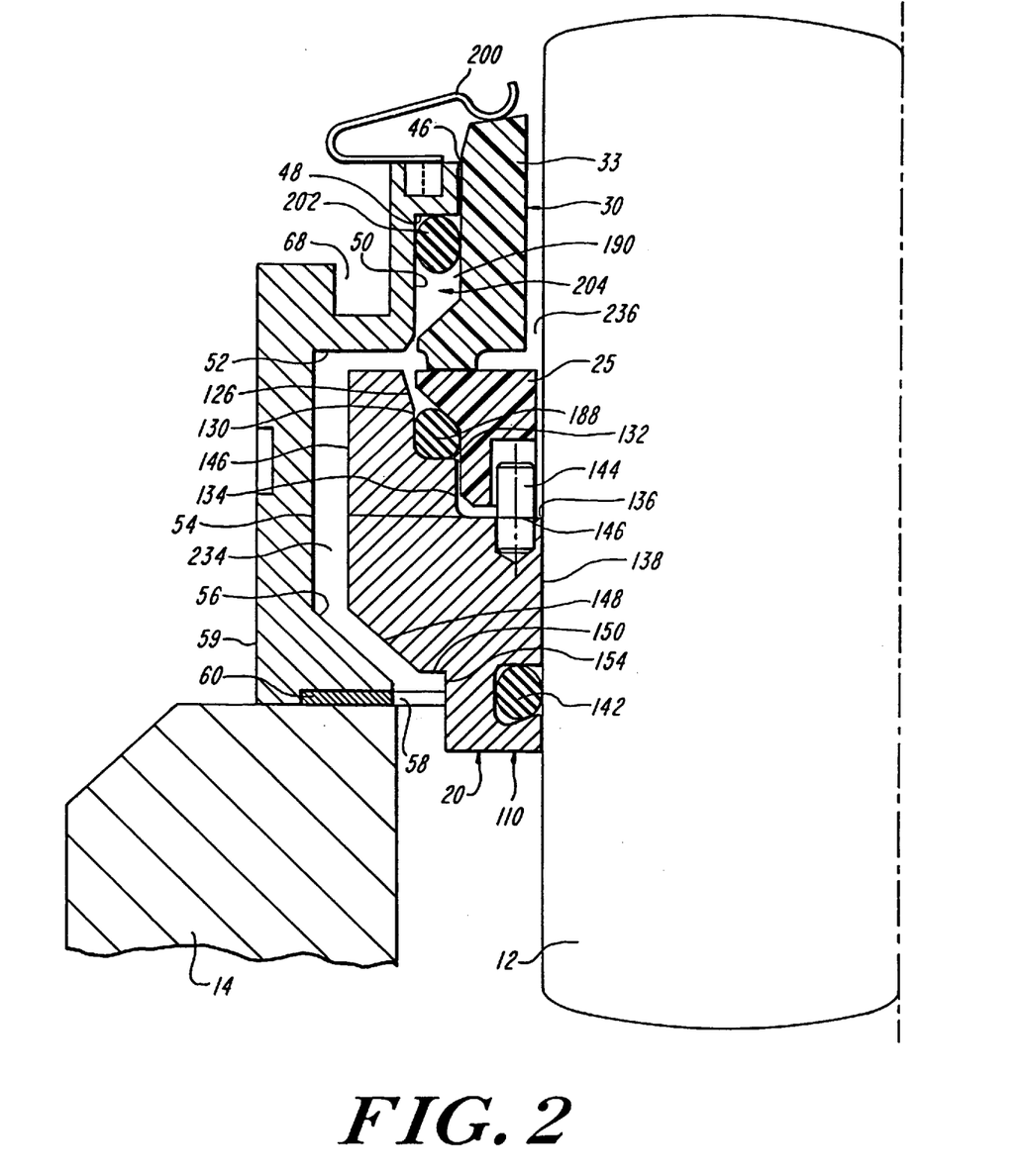
FIG. 2 is a fragmentary view of the mechanical seal of FIG. 1.
Figure 3:
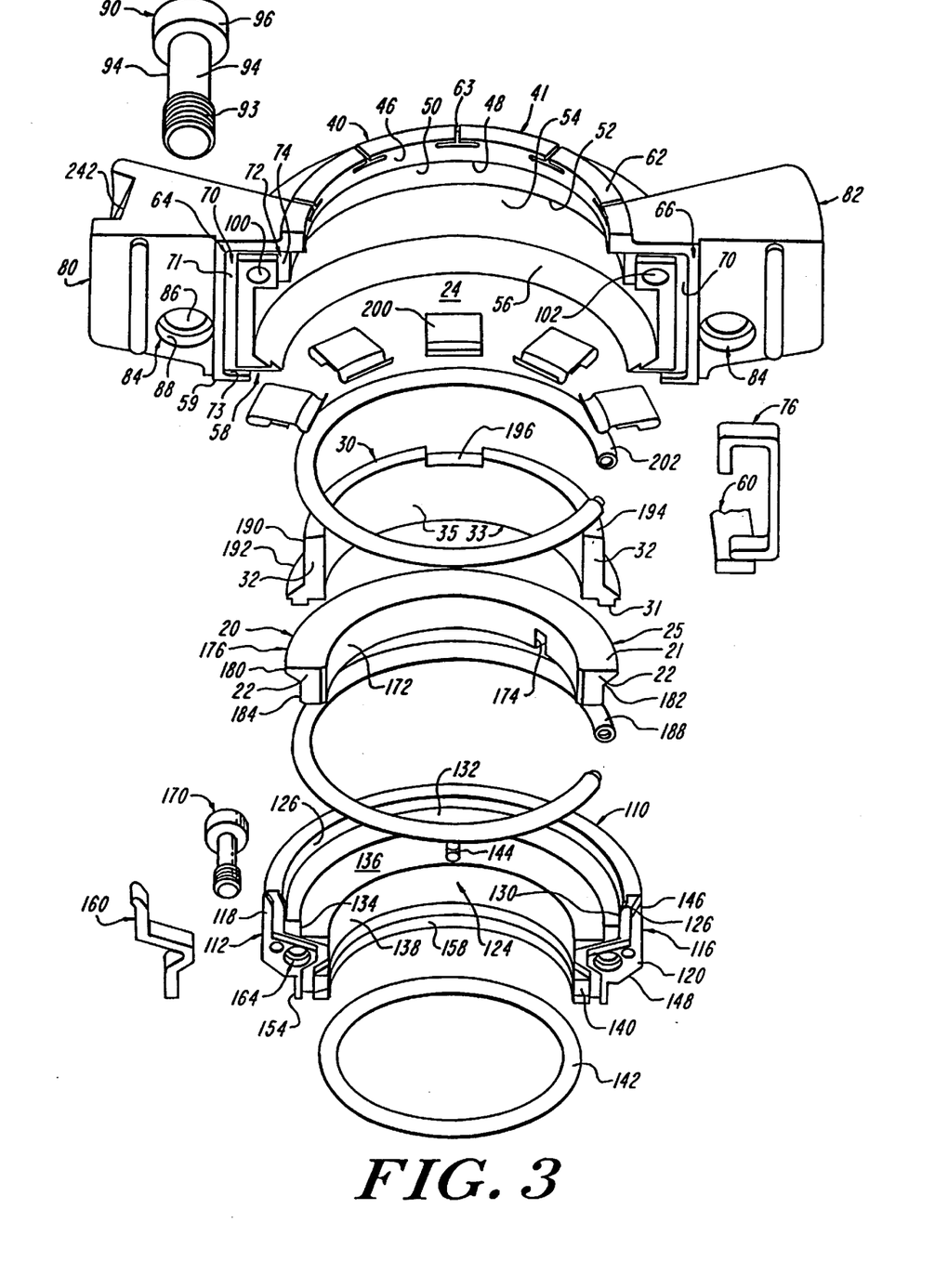
FIG. 3 is an exploded unassembled view of one half of the mechanical seal of FIG. 1 taken along line 3—3.

The gland assembly 40 has a housing gasket groove 58 formed along a bottom 59 of the gland assembly 40. The groove 58 seats a flat, annular elastomeric gasket 60. As illustrated in FIGS. 2 and 3, the gasket 60 preferably has an axial dimension greater than the depth of the groove 58, thereby providing a pressure-tight and fluid-tight seal between the mechanical seal 10 and the housing 14. In a preferred embodiment, the housing gasket 60 is pre-cut into two arcuate segments for mounting in each gland segment 41, 42. The housing gasket segments are preferably mounted in the groove 58 and secured thereto by an adhesive. This arrangement helps prevent leakage of the process medium along the seal 10 when mounted to the housing 14.

Each gland seal face 64, 66 has formed thereon a gland gasket groove 70. The groove 70 has a main axial portion 71 which extends from the gland second face 50 to the gland fourth face 56. Groove segments 72, 73, transverse to the main groove segment 71, extend along the second gland wall 52 and the gland fourth face 56, respectively, and groove segment 74, spaced radially inward from groove segment 71, extends along the gland segment second face 50.

Figure 1:
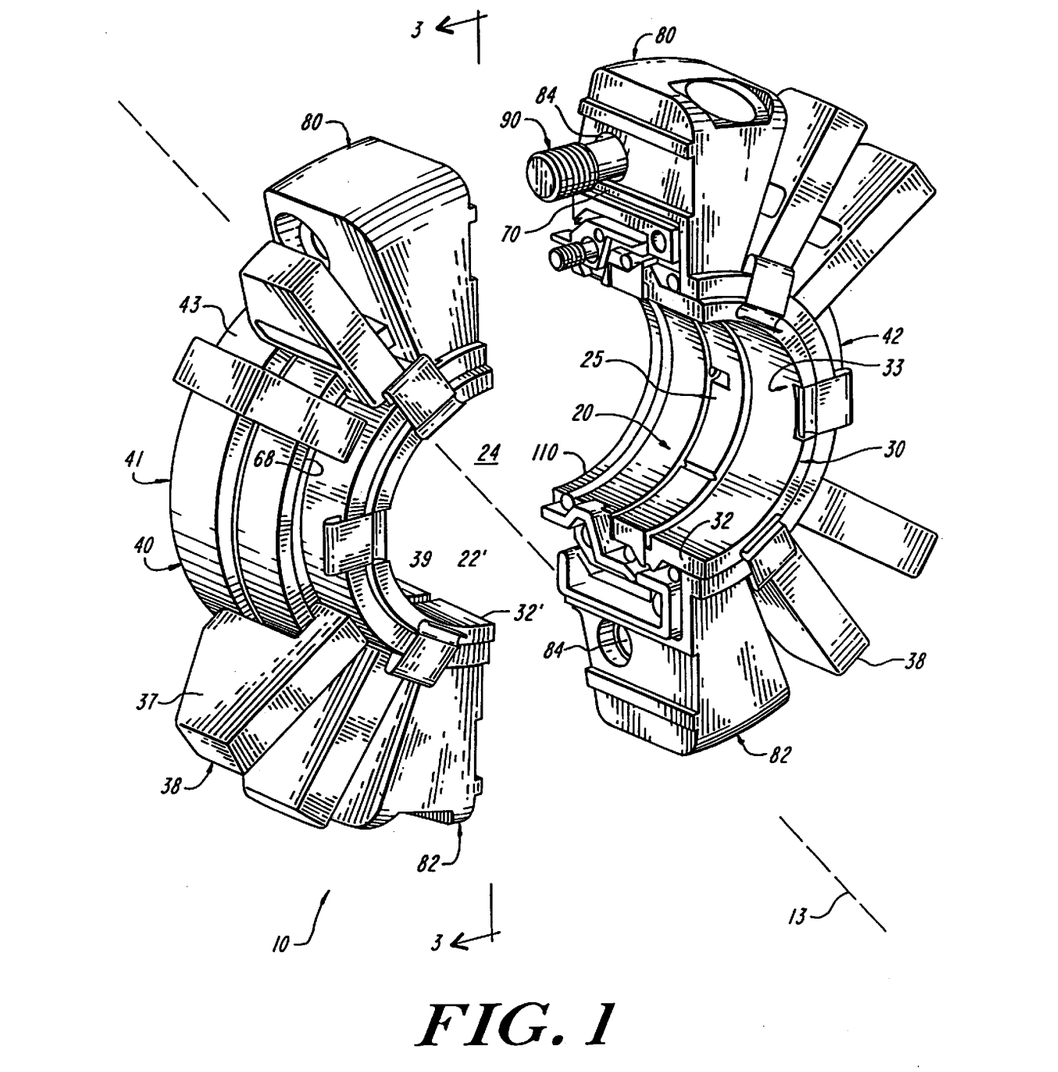
FIG. 1 is a perspective view of a split mechanical seal separated into two segments according to a preferred embodiment of the invention.
Figure 4:
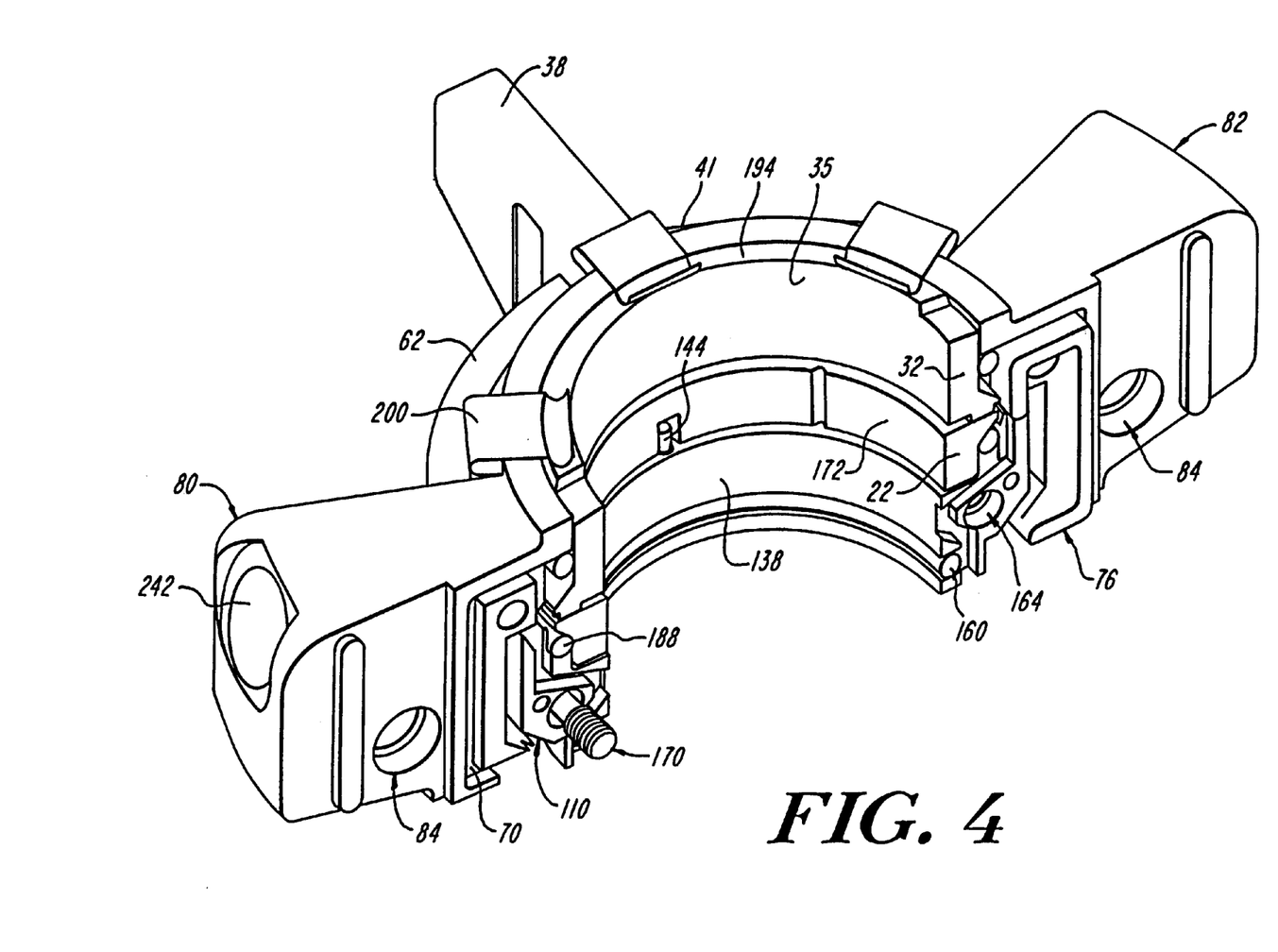
FIG. 4 is an a perspective view of one-half of the mechanical seal of FIG. 1.
Figure 5:
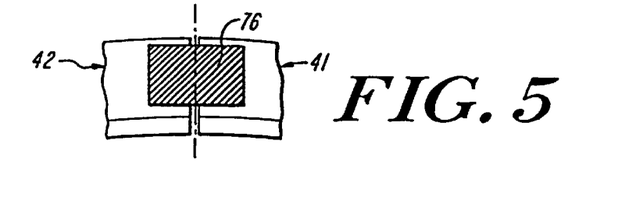
FIG. 5 is a top fragmentary view of a portion of the mechanical seal of FIG. 1.

An elastomeric gland gasket 76, complementary in shape to the gland groove 70, seats in the groove 70. It is a significant feature of the present invention that the gasket 76, when seated in the groove 70, extends beyond the gland split faces 64, 66, as best shown in FIGS. 1, 4 and 5. The exposed portion of the gasket 76 is captured in a complementary groove formed on the split gland seal face of the other gland segment 42. Capturing both ends of the gasket 76 between opposing split gland seal faces prevents the gasket 76 from extruding into the gap formed between the split gland seal faces when subjected to pressures higher than a selected maximum pressure. This double-capturing feature thus allows the gland segments 41, 42 to withstand greater pressures without developing pressure leaks, as well as relaxing the mechanical tolerances of other components of the mechanical seal 10. The gland gasket 76 is preferably formed from any suitable resilient material, such as elastomeric rubber. Further, although the gasket 76 has the illustrated shape, those of ordinary skill will recognize that the gasket 76 and its corresponding groove 70 can have any suitable geometric configuration.

Figure 6A:
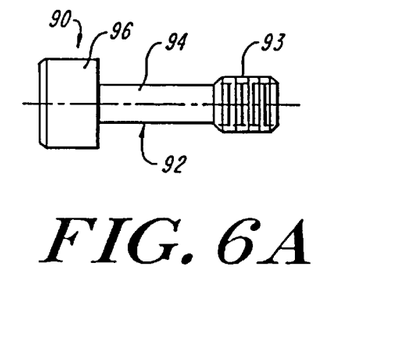
FIG. 6A is a side view of a gland or holder screw according to a preferred embodiment of the invention.
Figure 6B:
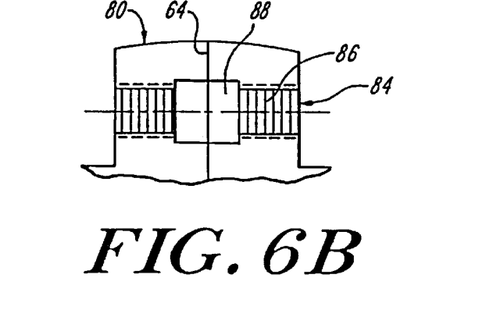
FIG. 6B is a broken perspective view of the screw housing of FIG. 1 according to a preferred embodiment of the invention.

Each of the gland segments 41, 42 also have integrally formed therewith a pair of screw housings 80, 82. Each screw housing has a transverse fastener-receiving aperture 84 formed substantially therethrough. The aperture 84 has a tapped smaller-diameter portion 86, and a concentric untapped larger-diameter portion 88, as shown in FIGS. 1, 6A and 6B. Preferably, the untapped portion 88 of the aperture 84 is disposed closest to the gland seal faces 64, 66.

The transverse aperture 84 mounts a screw 90 having the illustrated configuration. The screw 90 preferably has a main shaft 92 and a screw-head portion 96. The screw shaft 92 has a threaded distal portion 93 and an untapped proximal portion 94, as shown in FIGS. 1 and 6A. The outer diameter of the threaded portion 93 is greater than the outer diameter of the proximal portion 94. As illustrated in FIG. 6B, each screw 90 fastens together a pair of housings 80 and 82. When the threaded distal portion 93 of the screw 90 is screwed into the tapped portion 86 of the aperture 84, the distal portion 93 is positively maintained in the aperture 84. As the screw 90 further travels through the aperture 84, the screw distal end enters the untapped portion 88, or clearance gap of the aperture 84. In this orientation, the screw 90, although not snugly secured, is still positively maintained (i.e., not detachable) in the aperture 84. In a preferred embodiment, the diameter of the screw distal portion 93 is close to the diameter of the tapped smaller-diameter portion 86 of the screw housings 80,82.

Significant advantages are enjoyed by the screw 90 and the aperture 84 of the present invention. In particular, the screw 90 can be mounted in the fastener-receiving aperture 84 from any side of either gland segment 41, 42 prior to assembly, which is particularly useful in limited access installations, and is positively maintained in the screw housing 80. By preventing the screw 90 from completely detaching from the screw housing 80 prevents accidental loss of the screw 90 during assembly and disassembly, thus facilitating assembly of the seal while reducing installation time. The same construction pertains to the screw housings 82.

The gland assembly 40 further includes a plurality of bolt-tabs 38. The bolt-tabs 38 have a main body 37 that has integrally formed at one end an inserting-tab projection 39. The tab projection 39 mounts in an annular groove 68 formed around the periphery of the gland assembly 40. The angular position of the tabs can be adjusted by sliding the bolt-tab 38 and the tab projection 39 about the groove 68.

The bolt-tabs 38 help secure the mechanical seal 10 to the housing 14 by seating mounting bolts (not shown). In use, the mounting bolt is inserted between a pair of adjacent bolt-tabs. The bolt-tabs 38 are further described in detail in U.S. Pat. No. 5,209,496, assigned to the assignee hereof and which is herein incorporated by reference.

As illustrated in FIGS. 1–4, a holder assembly 110 is disposed in a chamber 24 formed by the gland assembly 40, and spaced radially inward therefrom. It should be understood however, that the holder assembly 110 need not be disposed within the gland assembly. Rather, the holder can be axially spaced from the gland assembly 40. The holder assembly 110 has a pair of arcuate holder segments 112, 114, each identical to the other. Each holder segment 112, 114 has an outer surface 116 and an inner surface 124. The holder segment inner surface 124 has a radially inward sloping first face 126 that terminates in an axially extending second face 130. A pair of successive radially inward stepped surfaces form a third face 134 and a fourth face 138, respectively. The second face 130 and the third face 134 have a radially inward extending first wall 132 integrally formed therebetween, and the third face 134 and the fourth face 138 have a radially inward extending second wall 136 integrally formed therebetween. The diameter of the fourth face 138 is preferably equal to or slightly greater than the diameter of the shaft 12, to which the holder assembly 110 is to be attached.

The holder segment outer surface 116 has a first axially extending outer surface 146, a radially inward sloping second outer surface 148, and a radially inward stepped third outer surface 154. The third outer surface 154 and the second outer surface 148 form, in combination, a radially inward extending first outer wall 150. In a preferred embodiment, the outer diameter of the holder segment third outer surface 154 is less than the diameter of the gland segment fourth face 56. This clearance is necessary to allow the holder assembly 110 to seat within the gland assembly 40 for unobstructed rotational movement therein. The outer diameter of the first outer surface 146 is preferably less than the inner diameter of the gland segment third face 54, and preferably greater than the gland segment second face 50.

The fourth face 138 of the holder segment 112 has formed thereon an annular channel 140 for mounting a split shaft gasket 142. When mounted in the channel 140, the gasket 142 sealingly mates with the shaft 12, providing a fluid-tight seal along the holder and shaft interface (see FIG. 2). The second wall 136 preferably has axially extending therefrom a cylindrical protrusion 144. The protrusion 144 operates as a mechanical rotary means by biasing the rotary seal ring 20 into rotational movement, as described in greater detail below.

The holder segments 112, 114 have formed on each split holder seal face 118 and 120 a holder gasket groove 158, having the configuration illustrated in FIGS. 1–4. A holder gasket 160, complementary in shape to the groove 158, seats in groove 158. It is also a significant feature of the present invention that the holder gasket 160, when seated in the groove 158, extends beyond the holder seal faces 118, 120, as best shown in FIG. 4. The exposed portion of the gasket 160 seats in a complementary groove formed in the opposite holder segment seal face. This arrangement provides for a fluid-tight seal at pressures higher than a selected value, as described above. The gasket is preferably composed of any suitable deformable material, such as elastomeric rubber.

The holder segments 112, 114 also have a fastener-receiving aperture 164 that mounts screw 170. The holder aperture 164 is similar to the fastener-receiving aperture 84 of the gland screw housing 80,82, and the screw 170 is similar to the screw 90. Likewise, the screw 170 and aperture 164 operate in the aforementioned manner.

The holder assembly 110, the gland assembly 40, and the screws 90 can be formed from any suitably rigid material, such as stainless steel.

The rotary seal ring assembly 20 also includes a pair of arcuate rotary seal ring segments 25. The rotary ring segments have a substantially smooth arcuate inner surface 172 and an outer surface 176, as best shown in FIG. 3. The inner surface 172 has formed thereon a generally rectangular notch 174. The notch 174 mounts over the holder protrusion 144. The rotary segment outer surface 176 has an axially extending first outer surface 180 that terminates in a radially inward sloping second outer surface 182 or abutment, and an axially extending third outer surface 184. The rotary segment 25 also has the smooth arcuate sealing surface 21 disposed at the top of the ring 20. The inner diameter of the rotary seal segments inner surface 172 is greater than the diameter of the shaft to permit mounting thereon. The diameter of the rotary seal segment third outer surface 184 is equal to or slightly less than the diameter of the holder segment third face 134, for mounting engagement with the holder assembly 110. The diameter of the rotary seal segment first outer surface 180 is less than the inner diameter of the holder segment first face 126, and greater than the diameter of the holder third face 134.

Although the illustrated seal ring 20 has an abutment 182 formed at the outer surface 176, those of ordinary skill will recognize that a non-sloping stepped annular surface could also be employed.

An elastomeric member, such as O-ring 188, is concentrically disposed about the rotary seal ring 20. In a preferred embodiment, the O-ring 188 seats along the first wall 132 of the holder assembly 110 and abuts the second and third outer surfaces 182, 184 of the rotary seal ring 20, as shown in FIG. 2. The O-ring 188 is sufficiently resilient to place each of the rotary segment sealing faces in sealing contact with another segment, thereby forming a fluid-tight and pressure-tight seal. The O-ring 188 also functions, in cooperation with a mechanical clip 200, as an axial resilient biasing means by floatingly and non-rigidly supporting the rotary and stationary seal rings 20,30 in axially spaced floating relation relative to the rigid walls and faces of the gland and holder assemblies 40, 110. This floating relationship was first described in U.S. Pat. No. 4,576,384, assigned to the assignee hereof, and is herein incorporated by reference.

As best shown in FIG. 3, the stationary seal ring 30 similarly includes a pair of arcuate seal ring segments 33, 33, each identical to the other. The stationary seal ring arcuate segments 33 have a substantially smooth arcuate inner surface 35 extending parallel to the first axis 13 and an outer surface 36. The stationary seal ring segment outer surface 36 has an axially extending first outer surface 190 that terminates in a radially outward extending abutment 192. The stationary seal ring 30 has a substantially smooth arcuate top surface 194 and a smooth arcuate ring sealing surface 31 disposed at the bottom of the ring. The stationary seal segment 33 has a recess 196 formed along the top surface 194. A mechanical clip 200, mechanically coupled to a top surface 62 of the gland assembly 40 via clip groove 63, seats in the recess 196. This arrangement helps align and seat the stationary seal ring 30 in the chamber 24, as well as functioning as a mechanical impedance for preventing the stationary seal ring 30 from rotating with the shaft 12 and the rotary seal ring 20.

The inside diameter of the stationary segment inner surface 35 is greater than the shaft diameter, and is greater than the diameter of the inner surface 172 of the rotary seal ring 20, thereby allowing relative motion therebetween. An elastomeric member, e.g., O-ring 202, provides a radially inward biasing force sufficient to place the segment sealing faces 32 of stationary seal ring segment 33 in sealing contact with the other stationary seal ring segment. Additionally, O-ring 202 forms a fluid-tight and pressure-tight seal between the gland assembly 40 and the stationary seal ring 30. The O-ring 202 seats in a first mounting region 204 defined by the gland segment first wall 48, the gland second face 50, the stationary ring outer surface 190, and the stationary ring abutment 192. In a preferred embodiment, the abutment 192 forms an angle relative to the stationary ring outer surface 190 preferably in the range of about 30° to about 60°, and most preferably about 45°. The stationary seal ring 30 is preferably composed of a carbon or ceramic material, such as alumina or silicon carbide and the like.

The mechanical clip 200 also functions as an axial biasing means by providing resilient support for the stationary and rotary seal rings 20, 30 by axially biasing the seal rings such that the stationary and rotary sealing surfaces 21 and 31 are disposed in sealing contact with each other. As illustrated in FIG. 2, the seal rings 20, 30 are floatingly and non-rigidly supported in spaced floating relation relative to the rigid walls and faces of the gland and holder assemblies 40, 110. This floating and non-rigid support and spaced relationship permits small radial and axial floating movements of the rotary seal segments 25,25 and the stationary seal segments 33,33 with respect to the shaft 12, while still allowing the rotary sealing surface 21 to follow and to be placed in sealing contact with the smooth arcuate sealing surface 31 of the stationary seal ring 30. Thus, the rotary and stationary seal ring sealing surfaces 21 and 31 are self-aligning as a result of this floating action.

Figure 7:
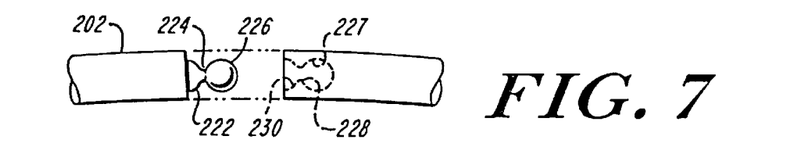
FIG. 7 is a sectional view of an elastomeric member.

As generally illustrated in FIG. 7, identical ball and socket fastening mechanisms are provided on the free ends of O-rings 188 and 202. At one end, O-ring 202 narrows into a substantially hemispherical shoulder portion 222 and, adjacent thereto, annular neck portion 224. immediately adjacent neck portion 224 is substantially spherical head portion 226. In fastening, head portion 224 is inserted into matching spherical socket portion 227 at the other end of O-ring 202 such that annular collar portion 228 surrounds and captures neck portion 224, and shoulder portion 222 is in intimate contact with annular jacket portion 230. Additionally, although the mechanical seal 10 and its associated components are depicted as sectional parts, the O-rings 188 and 202 are continuous and complete structures having the above configuration.

In assembly, the rotary seal segments 25,25 are mounted about the shaft 12 and mounted in the holder assembly 110 by aligning the rectangular notch 174 of the rotary seal ring segment 25 with the axially extending holder protrusion 144. The O-ring 188 is concentrically disposed about the rotary seal segments 25, and is further placed in sealing contact with the holder second face 130, the holder first wall 132, and with the rotary seal outer surfaces 182, 184. The O-ring 188 provides an inward radial force sufficient to place the rotary seal faces 22 of the seal segment 25 in sealing contact with each of the sealing faces 22 of the other rotary segment. The holder segments 112,114 are then secured together by tightening the screws 170 that are positively maintained in the fastener-receiving apertures 164. As shown in FIGS. 1–3, the rotary seal ring segments 25,25 are spaced from the holder assembly inner surfaces 124, and are non-rigidly supported therein by the O-ring 188, thereby permitting small radial and axial floating movements of the rotary seal ring 20.

The stationary seal ring segments 33 are concentrically mounted over the shaft 12, and secured together by O-ring 202. The O-ring 202 applies a radially inward force to the stationary seal ring outer surface 36 sufficient to place the segment sealing faces 32 of each segment in sealing contact with each other.

The gland segments 41,42 are concentrically placed about the holder assembly 110 and the rotary and stationary seal rings 20,30, and are secured together by screws 90 that are mounted in and positively maintained by the fastener-receiving apertures in the screw housings 80 and 82. The screws 90 cannot be unintentionally removed from the mechanical seal 10 since they are secured to the gland assembly 40 by the inventive fastener-receiving aperture 84 and screw 90. Additionally, mounting the screws 90 does not necessitate rotating the shaft since the screws 90 can be secured from the same or opposite sides of the gland assembly 40.

Figure 10:
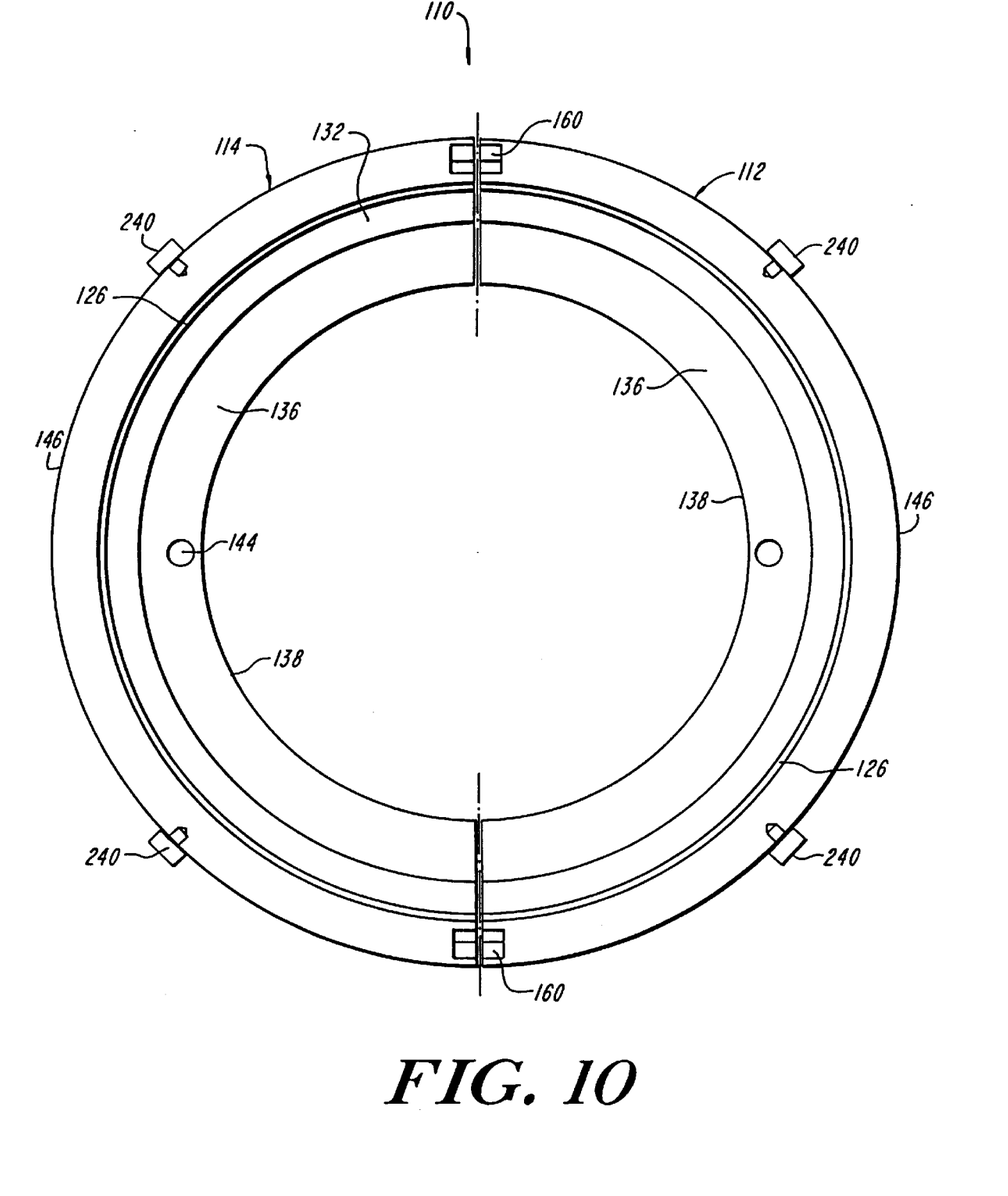
FIG. 10 is a plan view of a holder assembly according to a preferred embodiment of the invention.

Prior to fully securing the gland screws 90 to the housing 14, the shaft 12, the holder assembly 110, and the rotary and stationary seal rings 20,30 should be centered within the chamber 24. According to this inventive mechanical seal, the shaft 12 and holder assembly 110 center the gland segments 41,42 by way of centering spacers 240 formed along the outer surface 116 of the holder assembly 110, as shown in FIG. 10. The spacers can be integrally formed on the holder outer surface 116, or can be mounted in depressions formed along the holder outer surface 116. In a preferred embodiment, the spacers 240 are circumferentially and evenly spaced about the first outer surface 146 of the holder assembly 110. The spacers 240 are preferably formed of a soft wearable material, such as teflon, which prevents scoring of the gland inner surface during rotational movement of the holder assembly 110. Although the FIG. 10 embodiment shows four evenly separated spaces, any number and spacing of spacers can be employed. Additionally, the spacers 240 need not be formed on the holder first outer surface 146, but can be formed at various holder locations.

Figure 11:
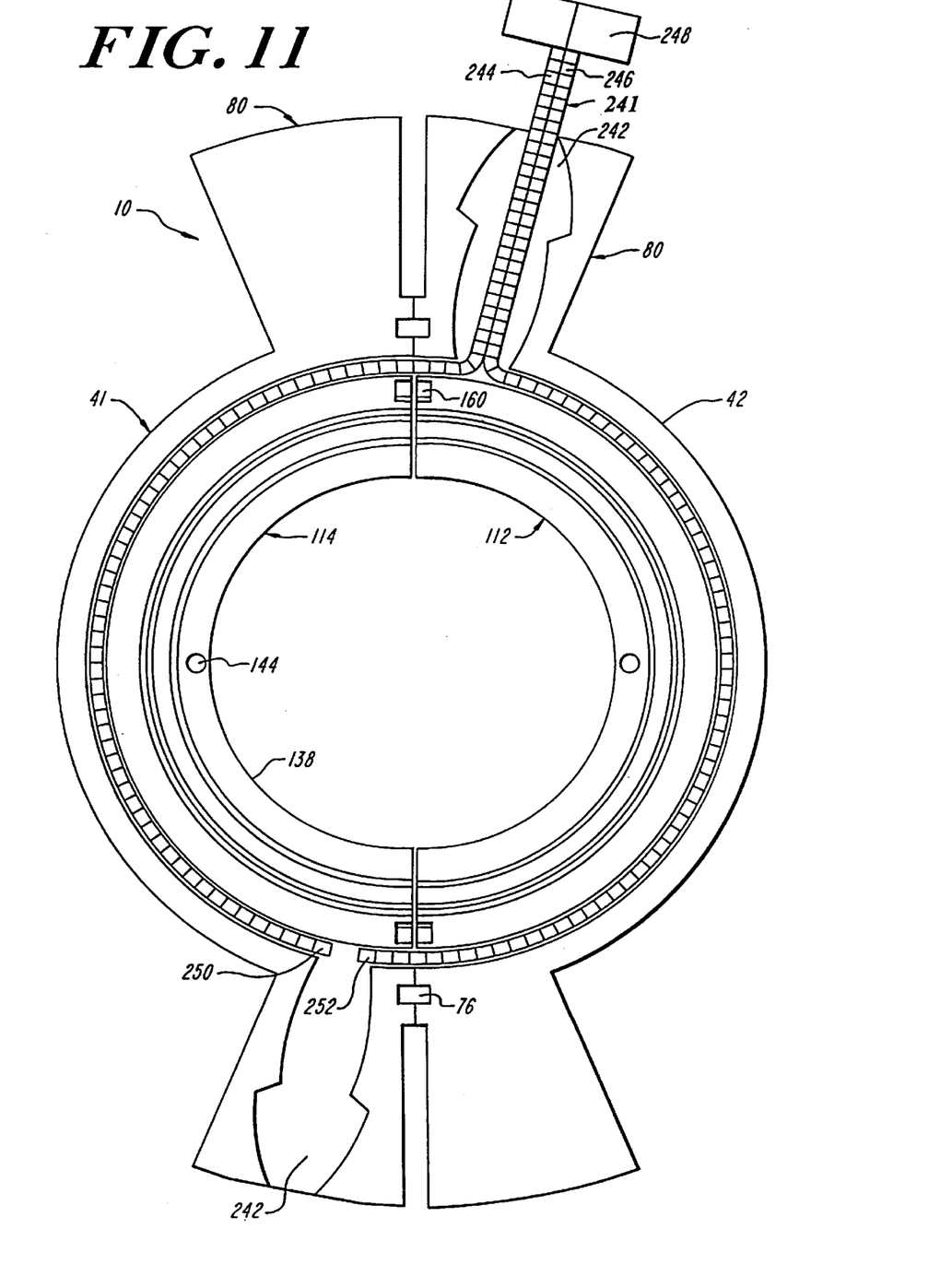
FIG. 11 is a plan view of the mechanical seal of FIG. 1 showing a centering mechanist according to one preferred embodiment.

An alternate embodiment of a shaft centering mechanism is depicted in FIG. 11. In FIG. 11, a centering strap 241 passes through a transverse port 242 formed in the screw housings 80 and 82. The centering strap 241 includes a pair of flexible elongate segments 244,246 attached to a handle 248. The transverse port 242 opens onto the exterior of the screw housing 80, (or 82) and into the chamber 24 formed by the gland assembly 40. The hexagonal bolt (not shown) caps this opening and isolates the interior of the port from the ambient environment. The strap is preferably made of a plastic material. When centering the shaft 12 and the holder assembly 110 in the chamber 24, the front ends 250,252 of the centering strap 241 are inserted into the port 242 until the ends 250,252 contact the holder assembly 110, temporarily impeding the path of the strap 241. As the strap 240 is further inserted into the port 242, the strap ends 250,252 travel about the periphery of the holder assembly 110, until the strap nearly encloses the holder assembly 110. Thus, the strap functions to uniformly space the holder assembly 110, and thus the shaft 12, from the gland inner surface. Those of ordinary skill will recognize that the centering mechanisms can be employed in both split and non-split mechanical seals.

When the gland assembly 40 and the holder assembly 110 are properly aligned, the gland gasket 76 and the holder gasket 160 are captured in separate gasket grooves formed on opposite sealing faces of the gland and holder segments. This double-capture configuration allows the mechanical seal 10 to withstand higher pressures without degradation of the pressure and fluid seals formed at the segment sealing faces. Additionally, the O-ring 202 forms a pressure-tight and fluid-tight seal between the gland inner surface, e.g. gland second face 50 and first wall 48, and the outer surface 36 of the stationary seal ring 30.

After the mechanical seal is assembled and mounted to the pump housing 14, the pump process medium, e.g. hydraulic fluid, is sealed within a process medium channel 234, as shown in FIG. 2, defined by the gland inner surface 54 (excluding the gland first face 46), O-ring 202, the holder assembly outer surface 116, the stationary seal ring outer surface 190 and abutment 192, the rotary seal ring first and second surfaces 180,182, the holder assembly first and second faces 126,130, and O-ring 188. The ambient environment medium, typically air, fills an ambient process channel 236, typically sealed from the process channel 234, that is defined by the stationary and rotary seal ring inner surfaces 35,172, the stationary ring outer surface 190, the gland first and second faces 46,50 and first wall 48, the rotary seal ring third outer surface 184, and the holder assembly first wall 132. The phrase "ambient environment" is intended to include any external environment other than the internal environment of the housing 14.

The stationary and rotary seal ring segment sealing faces 22,32 are placed in sealing contact with the other segment of the pair by the radial force of the O-rings 188 and 202. In addition, the hydraulic pressure of the process medium contained within the process channel 234 exerts an additional radially inward force, proportional to the fluid pressure, upon the seal ring segment outer surfaces 36,190, biasing the segment sealing faces 32 together.

Overall, the O-ring 142 prevents the seepage of process medium along the shaft 12 and into the ambient process channel 236. The flat O-ring 60 prevents the seepage of process medium along the housing 14 and mechanical seal 10 interface and the O-rings 188 and 202 prevent process medium from invading the ambient process channel 236 by way of the holder assembly 110 and the gland 40, respectively.

Figure 8A:
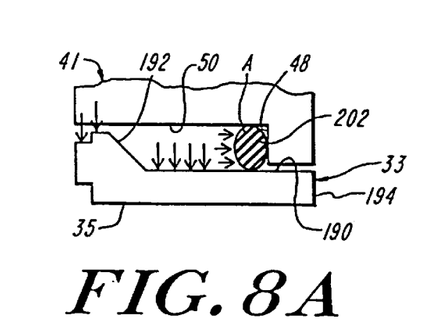
FIG. 8A is a fragmentary view of a stationary seal ring and gland assembly of FIG. 1 according to a preferred practice of the invention.

In operation, when the pressure of the process medium is greater than or equal to the pressure of the ambient environment medium (positive pressure), the O-ring 202 is seated in position A in the first mounting region 204, as shown in FIGS. 2, 4 and 8A. In this position, the process medium exerts an inward radial force upon the stationary seal ring outer surface 36, depicted in FIG. 8A as solid arrows, and applies an axial force (to the right in FIG. 8A) upon O-ring 202, sealing the O-ring against the first wall 48 of the gland inner surface and the stationary seal ring outer surface 190.

Figure 8B:
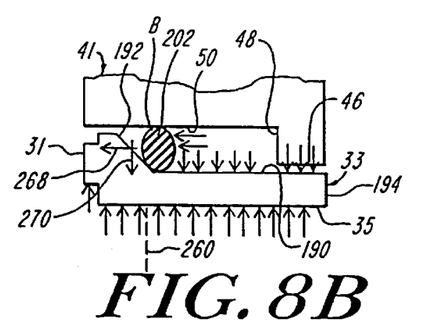
FIG. 8B shows the movement of the O-ring of FIG. 8A according to a preferred practice of the invention.

When the pressure of the process medium falls below the pressure of the external environment (negative pressure or vacuum), the ambient process medium biases O-ring 202 into position B disposed against the abutment 192, as shown in FIG. 8B. The phrase "negative pressure" is intended to include any pressure situation which results in the process medium being at a lower pressure than the ambient medium. The pressure applied by the ambient environment produces both an inward radial force and an outward radial force upon the stationary seal ring segments 35, 36, as shown by the solid arrows. In the first mounting region, the area that was formally occupied by process fluid and which was evacuated by the movement of the O-ring 202 (to the left in FIG. 8B) is now occupied by the ambient medium. The radially inward and outward forces generated by the ambient medium cancel along the length of the seal ring segment to the right of the dashed line 260, thus producing no net force. However, to the left of the dashed line 260 and of the O-ring 202, the outward radial force applied to the inner surface 35 of the stationary seal ring 30 is greater than the opposing pressure produced by the process medium, producing a net outward radial force. Opposing this outward force is O-ring 202. However, when the radially outward force exceeds the biasing force produced by the O-ring 202, the stationary seal segments separate along the sealing faces 32, thereby breaking the fluid-tight seal and exposing the process channel 234 to the ambient medium.

However, when the ambient medium forces the O-ring against the abutment 192, generating an axial force, the sloped abutment surface transforms this normal force into an axial force component 268 and a radial force component 270. The radial force component 270 forms a second or supplemental inward radial force. In a preferred embodiment, with the abutment slope forming a 45° angle, the second force component 270 is 0.707 times the magnitude of the outward radial force. For most pressure situations, this second radial force is sufficient to prevent the seal faces 32 of the stationary seal rings from separating, thus maintaining the fluid-tight seal. Furthermore, the axial force component 268 operates to maintain the smooth arcuate sealing surfaces 21 and 31 of the stationary and rotary seal rings 20,30 in sealing contact with each other.

According to a preferred practice of the invention, the sealing surfaces 21 and 31 of the stationary and rotary seal rings 20,30 can further be maintained in sealing contact with each other by reducing the net outward radial force. One preferred practice is to minimize the area of the stationary ring 30 exposed to the unbalanced outward radial force. As shown in FIG. 8B, the portion of the seal ring 30 to the left of the dashed line 260 is preferably minimized, thereby reducing the outward radial force applied to the seal ring inner surface 35 by the higher pressure ambient medium.

Figure 9:
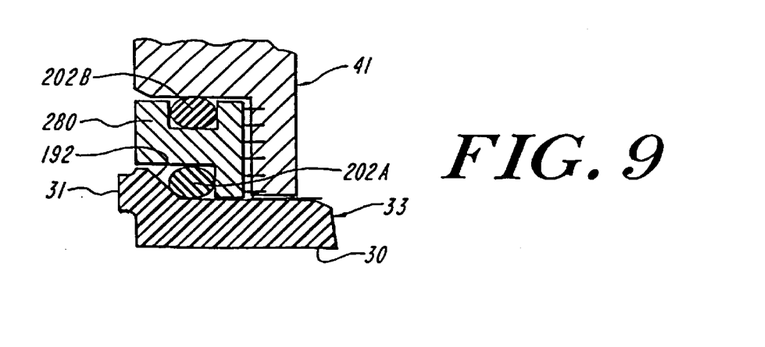
FIG. 9 is a view similar to FIGS. 8A and 8B showing an alternate embodiment.

In an alternate embodiment, as shown in FIG. 9, an intermediate force element 280 can be disposed between the stationary seal ring 30 and the gland inner surface. In a manner similar to that explained above, O-ring 202A, in cooperation with abutment 192, generate the second radial inward force, thereby maintaining the fluid-tight seal. Meanwhile, O-ring 202B creates a fluid seal between the process medium channel 234 and the ambient channel 236.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A split mechanical seal for mounting to a housing containing a rotating shaft, said mechanical seal comprising
   at least two arcuate gland segments having an inner surface defining a chamber, said gland segments including means forming an aperture for receiving a centering strap, said aperture formed substantially through said segments and opening onto said chamber, and at least two arcuate holder segments concentrically disposed about said shaft and disposed within said chamber, and radially inwardly spaced from said gland segment inner surface, said centering strap circumferentially and uniformly separating said holder segments from said gland segment inner surfaces, thereby centering said shaft within said chamber.

2. The seal of claim 1 wherein said centering strap comprises a handle and at least one flexible elongate segment coupled to said handle.

3. A split mechanical seal for mounting to a housing containing a rotating shaft, said mechanical seal comprising at least two stationary arcuate gland segments having an inner surface defining a chamber, at least two rotary arcuate holder segments having an outer surface and concentrically disposed about said shaft and within said chamber, said holder segments being radially inwardly spaced from said gland segment inner surfaces and configured for mounting a seal ring, and a centering element for substantially uniformly separating said rotary holder segment outer surface from said stationary gland segment inner surface, thereby centering said shaft within said chamber.

4. The split mechanical seal of claim 3 wherein at least one of said gland segments comprises an aperture extending substantially through at least one of said gland segments and opening onto said chamber.

5. The split mechanical seal of claim 4 wherein said centering element comprises an elongate centering strap configured for mounting within said aperture formed in said gland segment, and when mounted within said aperture is sized to seat within said chamber between said inner surface of said gland and said outer surface of said holder, said centering strap generally circumferentially and uniformly separating said holder segments from said gland segments when disposed within said aperture and extending within said chamber.

6. The split mechanical seal of claim 5 wherein said centering strap comprises a handle and at least one flexible elongate segment coupled to said handle.

7. A mechanical seal assembly for mounting to a housing containing a rotating shaft, said mechanical seal comprising a gland assembly having an inner surface defining a chamber, said gland including an aperture formed substantially through said gland and opening onto said chamber for receiving a centering strap, and a holder assembly concentrically disposed about said shaft and disposed within said chamber, and radially inwardly spaced from said inner surface of said gland assembly, said centering strap configured for mounting within said aperture formed in said gland assembly, and sized to seat within said chamber when mounted within said aperture between said inner surface of said gland assembly and said outer surface of said holder assembly, said centering strap generally circumferentially and uniformly separating said holder segments from said gland segments, thereby centering said shaft within said chamber.

* * * * *